United States Patent
Wisniewski et al.

[11] 3,728,050
[45] Apr. 17, 1973

[54] GEARED ENGINE

[75] Inventors: Wladyslaw Wisniewski; Jan Piotrowski; Zbigniew Szeler, all of Gdynia, Poland

[73] Assignee: Centrum Techniki Okretowej Przedsiebiorstwo Panstwowe Wyodrebnione, Gdansk, Poland

[22] Filed: Mar. 26, 1971

[21] Appl. No.: 128,368

[30] Foreign Application Priority Data

| Apr. 4, 1970 | Poland | P 139729 |
| Apr. 4, 1970 | Poland | P 139730 |

[52] U.S. Cl. ............................................. 418/165
[51] Int. Cl. ............. F01c 1/00, F03c 3/00, F04c 1/00
[58] Field of Search .................... 418/6, 10, 165, 167, 418/187, 188, 196

[56] References Cited

UNITED STATES PATENTS

| 2,399,008 | 4/1946 | Doran | 418/165 |
| 3,151,526 | 10/1964 | Van Hoene | 418/165 |
| 2,147,761 | 2/1939 | Whitcomb | 418/165 |
| 2,371,227 | 3/1945 | Dodge | 418/165 |
| 2,371,228 | 3/1945 | Dodge | 418/165 |

FOREIGN PATENTS OR APPLICATIONS

| 860,123 | 12/1952 | Germany | 418/165 |
| 871,692 | 3/1953 | Germany | 418/165 |

Primary Examiner—Carlton R. Croyle
Assistant Examiner—John J. Vrablik
Attorney—Karl F. Ross

[57] ABSTRACT

The invention relates to a geared engine which operates for liquid as well as for gas. If the arrangement is driven by another engine it operates as a gear pump or compressor. The geared engine consists of a central toothed wheel and of toothed wheels engaged with and offset around it, which toothed wheels are encircled by a toothed ring and meshed with it.

The medium flowing through the meshings of the toothed wheels and the central wheel and through the meshings of the wheels and the ring rotates them.

The toothed ring takes over the radial forces arising in the wheel, thus unloading the bearings of the wheels' axes. Depending on the construction of the engine the ring transfers the torque to the central wheel and further to the output shaft or to the casting, which can simultaneously be a winch barrel.

2 Claims, 4 Drawing Figures

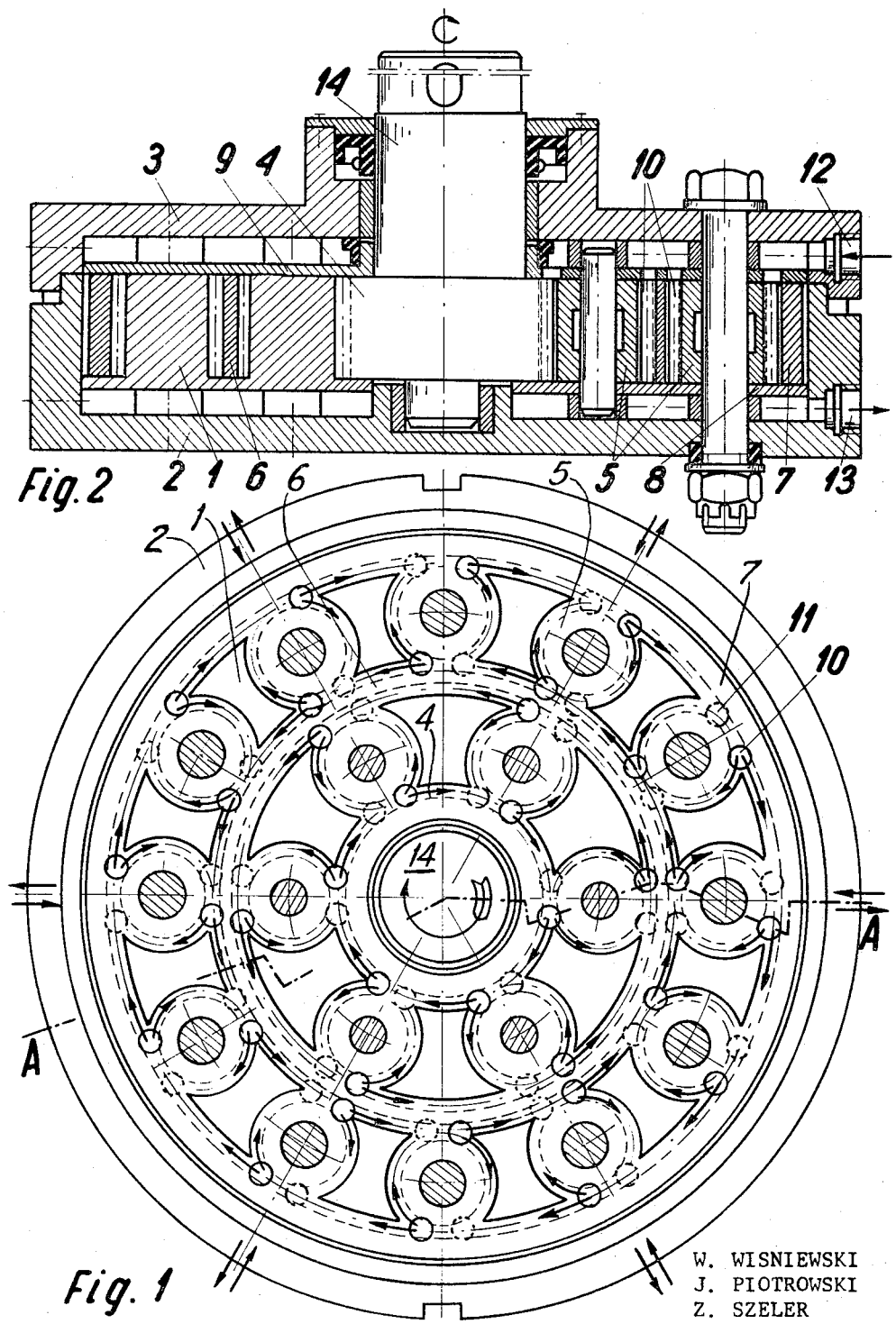

W. WISNIEWSKI
J. PIOTROWSKI
Z. SZELER
INVENTORS

GEARED ENGINE

Field of the Invention

This invention relates to a hydraulic geared engine for gas or steam, which driven by another engine, becomes a pump or compressor depending upon the working medium.

BACKGROUND OF THE INVENTION

Known geared engines consist of one driving wheel positioned in the center of the engine, and a large number of input wheels spaced around the driving wheel. The axes of the input wheels are spaced along concentric circles. The input wheels of the first inner circle mesh at the inner side with the driving wheel, but at the outer side with the wheels of the second circle. The wheels of the, last external, circle mesh only at the inner side with the wheels of the preceding circle and are free at the outer side. Consequently, the pressure on the outer driven wheels, acting on a part of the wheel circumference from the inner side, is not balanced and results in a load acting on the bearings of these wheels. This causes an unequal wear of the elements of these engines, shortens their useful life and due to the fact, that only a part of the teeth in the wheels of the last extreme circle is utilized, the efficiency of the geared engine is poor.

OBJECTS OF THE INVENTION

It is an object of the invention to eliminate partially the aforesaid disadvantages by projecting a more efficient geared engine with smaller outline dimensions and reduced weight and with a decreased number of elements. The engine according to the invention is intended also the one-sided load of the bearings in the outside toothed wheels.

SUMMARY OF THE INVENTION

These objects can be achieved by releasing the toothed wheels of the last outer circle from the action of the radial forces by the use of toothed rings with teeth (internal or ring gears), which engage the outer driven wheels or by the use of toothed rings with inside and outside teeth engaging the toothed wheels and engaging them (i.e. internally and externally toothed ring gears). The rings in the engine fulfil a double task, as driving members and as members receiving the radial forces. The toothed wheels and rings are limited at the sides by covers or side walls.

The driving moment is taken up by the shaft, but the working medium is supplied through the casing. A modification of the geared engine with a toothed ring or rings, is an engine wherein the toothed ring is connected with the drum which winds up ropes or chains (winch drum). Consequently the drive from the engine can be transferred directly to the drum of the driven machine. The engine according to this modification has a separable drilled shaft which serves as a duct for the medium.

The shaft ends inside the engine are equipped with disks provided with screws. Toothed wheels which cooperate with the internally and externally toothed rings are fixed on these screws. Between the disks, partitions are provided, which position the toothed wheels and rings on the screws and in common with the disks of the shaft ends make two chambers for the liquid, i.e. the inlet and the outlet chamber.

The geared engine is characterized by an exceptionally compact structure and small weight per unit torque.

With the geared machine according to the modification of the invention described above, due to the load separation by applying the bending load only to the drums or driving wheels and the torsional load only to the shaft with the division by one half of the torque on each section, exceptionally small dimensions and very small weight of the elements have been obtained. The small dimensions of the engine make it possible to place the engine inside of drums or driving wheels, to apply the machine in many technical fields, especially in the shipbuilding industry for the drive of conveyors, cargo winches, windlasses, trawl winches, mooring winches, capstans, etc.

The invention contributes to rather considerable material savings.

DESCRIPTION OF THE DRAWING

The invention will now be described with reference to the accompanying drawing, in which:

FIG. 1 is a view of the open geared engine with two toothed rings, and two circles of input wheels.

FIG. 2 is a section of the engine with two rings and two circles of wheels along the line A-A of FIG. 1.

SPECIFIC DESCRIPTION

Figure 4:
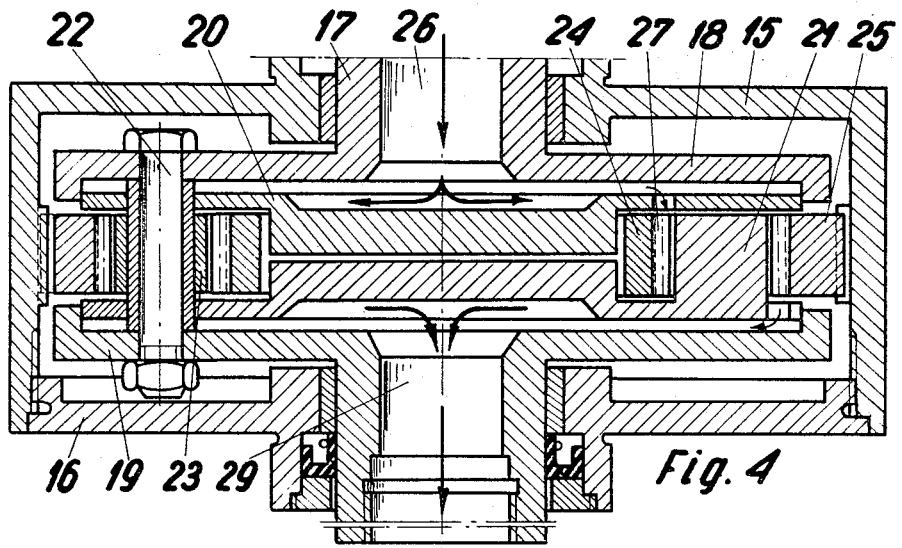
FIG. 4 is a section of of this engine along the line B—B of FIG. 3.
Figure 3:
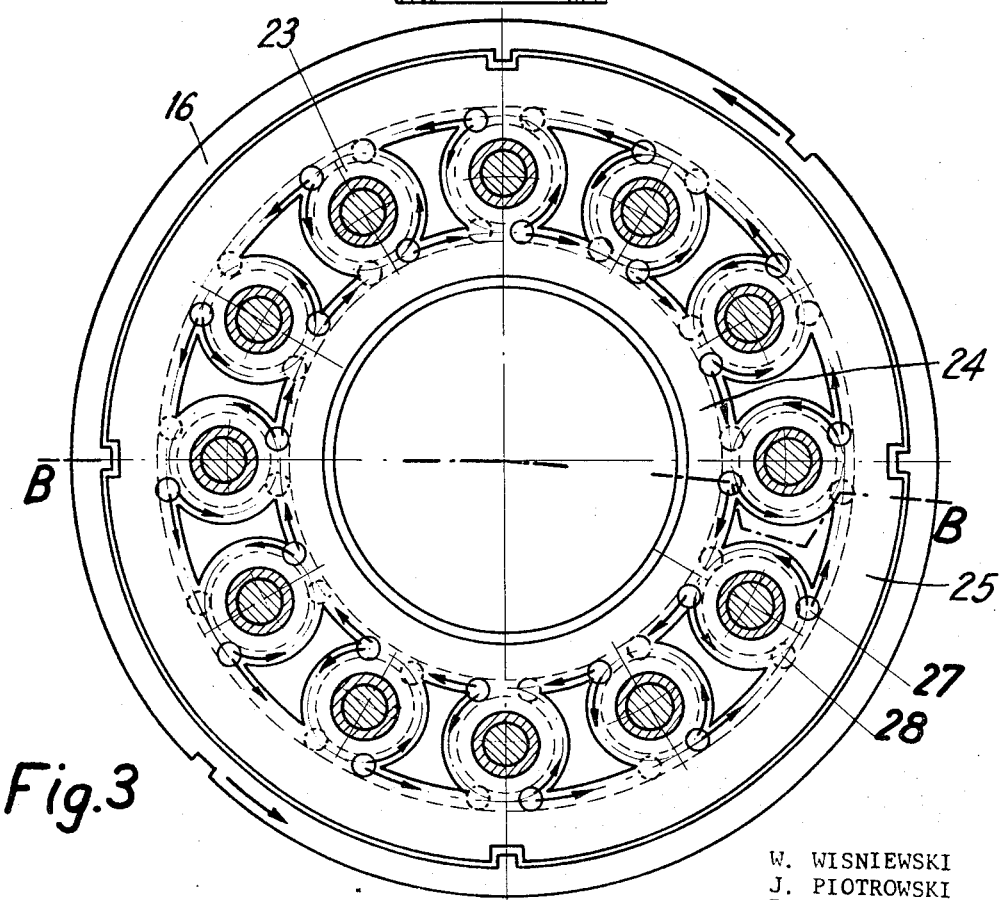
FIG. 3 is a view on the open geared engine according to the modification with supply and discharge of the medium through the shaft.

A shaft 14 with the driving wheel 4 is mounted in the housing 1 which is closed by means of the covers 2 and 3. The input wheels 5 are meshed with the driving wheel by means of the internally-and-externally toothed ring 6. The toothed ring 7 with internal teeth only is meshed with the wheels 5 positioned along the outer circle. The driving wheel 4, the input wheels 5, as well as the rings 6 and 7 are limited at the sides by walls 8 and 9, which have inlet holes 10 and outlet holes 11.

The medium flows into the engine through the holes 12, which are six in number symmetrically spaced along the circumference and then flows between the cover 3 and wall 9 to the inlet holes 10 and passing the gear teeth performs the work.

Having performed the work, the medium flows out through the holes 11 and 13.

In the engine according to the modification, inside the drum 15 and cover 16, an immovable hollow shaft 17 ended with disks 18 and 19 is mounted. Two partitions 20 and 21 are provided between the disks. Twelve screws 22, passing through the disks and partitions, are spaced symmetrically at the circumference. On these screws, there are mounted peripherally toothed wheels 23, which are engaged from the inner side of the engine with the toothed ring 24 and from the outer side with the toothed ring 25. The acting medium enters the engine through the hole 26 and passing the chamber between disk 18 and partition 20, enters the inlet holes 27. From these holes the medium flows through the meshings of wheels and rings, transfers its energy and is discharged through the outlet holes 28 and 29 off the engine. The toothed ring 25, which is put in motion, rotates the drum 15.

What we claim is:

1. A geared machine, comprising
   a. a housing including a casing surrounding a main axis, and a pair of walls transverse to said axis and closing opposite sides of the housing, said walls defining a compartment between them;
   b. a central gear within said compartment and journaled in said housing, said central gear being provided with peripheral outer gear teeth;
   c. an inner array of toothed wheels journaled for rotation within said compartment about individual axes equispaced along a first circle centered on said main axis and meshing with said central gear;
   d. an internally-and-externally toothed ring gear surrounding said inner array and centered on said main axis, said ring gear having internal teeth meshing with said toothed wheels;
   e. an outer array of toothed wheels journaled for rotation within said compartment about individual axes equispaced along a second circle centered on said main axis and meshing with external teeth of said ring gear;
   f. an internally toothed ring gear surrounding said outer array and centered on said main axis while meshing with the toothed wheels of said outer array; and
   g. means forming inlet and outlet ports in said housing adjacent said toothed wheels of both said arrays for admitting fluid to and leading fluid from said compartment, said fluid flowing along the toothed wheels of said outer array between said ring gears and along the toothed wheels of said inner array between the internally-and-externally toothed ring gear and said central gear.

2. The machine defined in claim 1, further comprising means connecting said internally toothed ring gear to said casing for driving same, said casing forming a winch drum.

* * * * *